April 25, 1933. A. KREMMLING 1,906,160
APPARATUS FOR FORMING MOLDED OR EMBOSSED ARTICLES OF PLASTIC MATERIAL
Filed Dec. 28, 1932 3 Sheets-Sheet 1
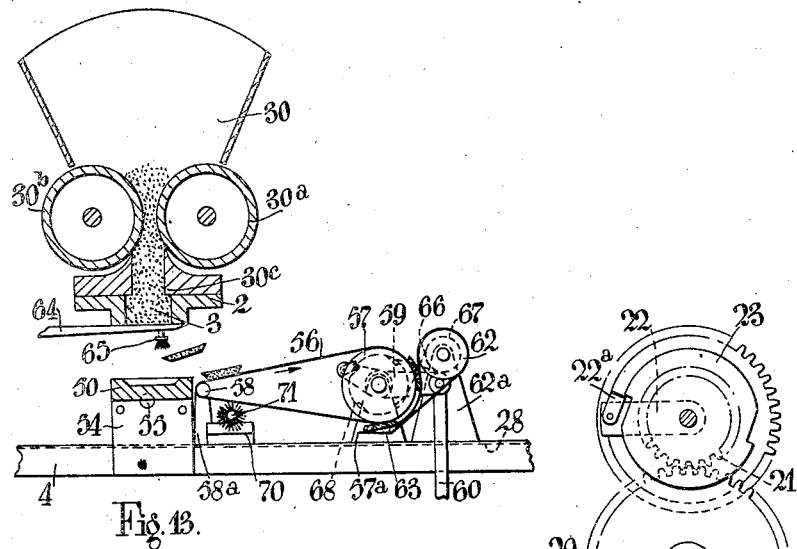
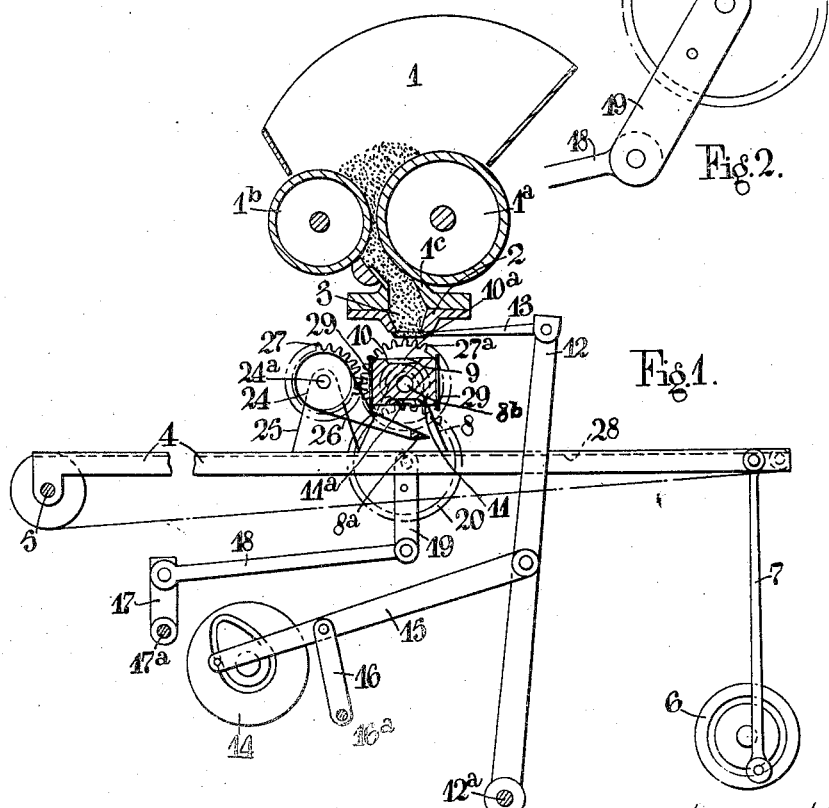

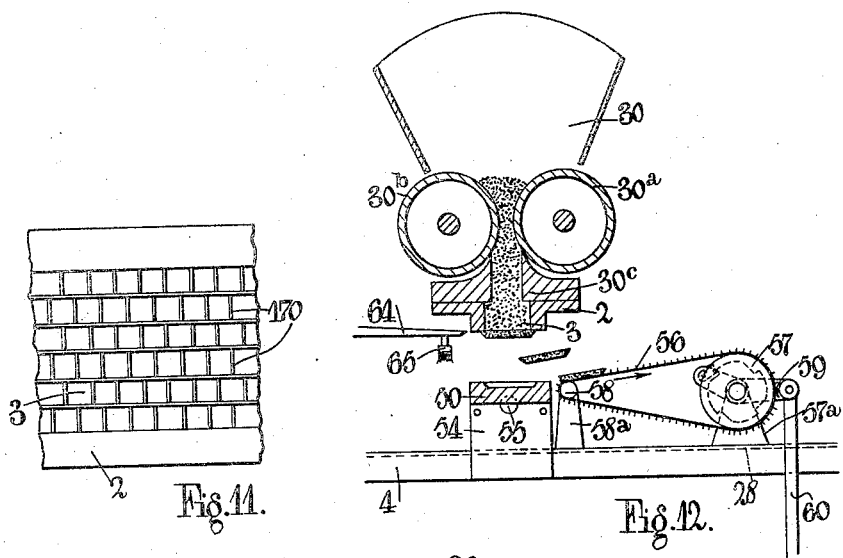
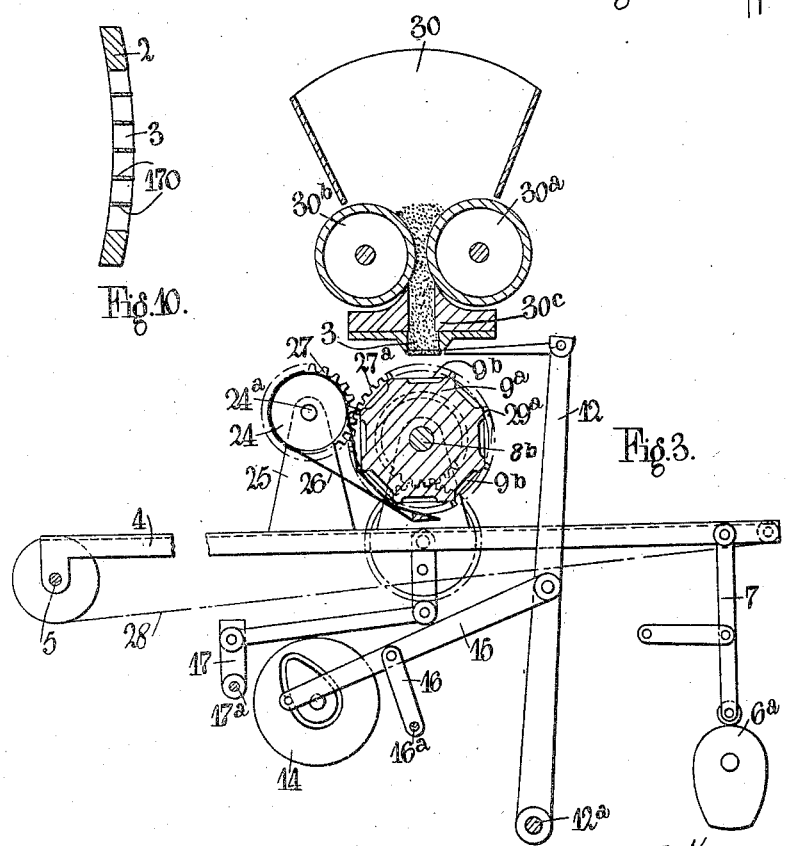

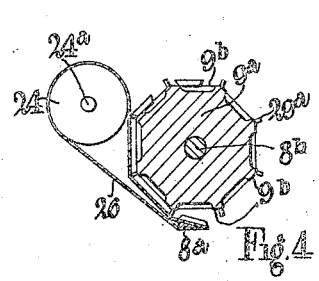
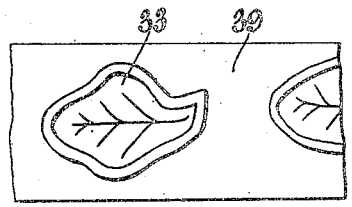
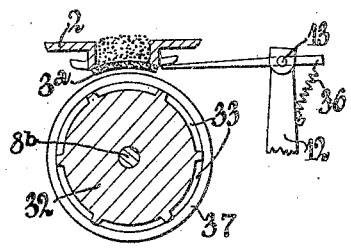
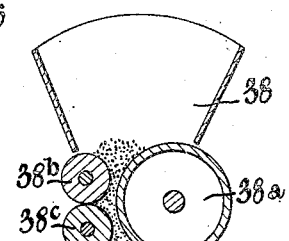
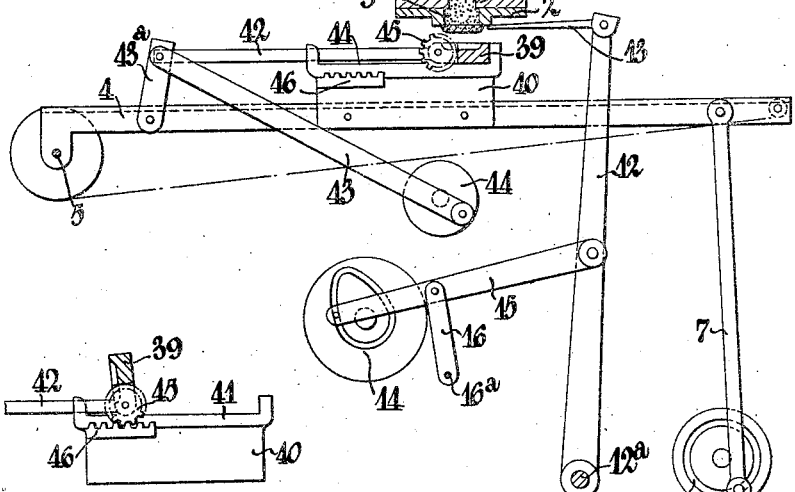

UNITED STATES PATENT OFFICE

ARIBERT KREMMLING, OF HAMMERSLEBEN, GERMANY

APPARATUS FOR FORMING MOLDED OR EMBOSSED ARTICLES OF PLASTIC MATERIAL

Application filed December 28, 1932, Serial No. 649,221, and in Germany January 12, 1931.

This invention relates to apparatus for the production of moulded or embossed articles in plastic material such as dough, marzipan or the like, the object being to provide an improved moulding or embossing apparatus in which the articles are more easily released from the moulds whereby the material is less harshly treated than hitherto so that sensitive substances may be treated without danger of spoiling the moulded articles.

A feature of the invention resides in the fact that the embossing moulds or elements, for the purpose of embossing the ends of material extruded through a die plate, are arranged so that they can be raised and lowered in relation to the extrusion or die plate and may be adapted to swivel if required for depositing or the like, so that the embossed side of the articles which was hitherto directed downwards is now on the top. According to the invention the moulded and embossed articles are drawn out of or released from the embossing moulds by lowering the latter, before the embossed articles are cut off from the body of material in the extrusion die openings.

According to the invention the embossing moulds may be arranged on rotary elements, or on plates, bars or the like. It is, however, entirely sufficient to have a bar or plate with moulds, whereby the cost of manufacture of the apparatus is considerably reduced. Moreover mould bars are much more rapidly and more easily interchangeable than moulding rolls which have to be fitted in the machine, provided with bearings and driven, so that the cost of running is likewise cheapened.

The extrusion openings may be arranged so that they give to the pressure of the mould, in order to release the compression in drawing out the embossed shapes in the mouthpieces after embossing, because in this way the embossed pieces can be cut at the right point. Apart from this it is of particular importance with a view to obtaining a tight joint between the extrusion mouthpiece and the moulding die, in that the individual surfaces fit together better than would otherwise be the case.

The extrusion opening may be split up by means of cross bars, an arrangement known in connection with wire-cut machines.

The accompanying drawings show a number of constructional examples of apparatus according to the invention:—

Figure 1 shows one form, partly in section, partly in elevation.

Figure 2 shows the control apparatus for rotating a mould element.

Figure 3 is a second constructional example with two feed rolls in the extrusion apparatus and an octagonal moulding roll.

Figure 4 is a detail of the device for the transfer of the article detached from the moulding roll onto a delivery conveyor band.

Figure 5 shows a further constructional example with a round moulding roll.

Figure 6 shows a constructional example with three feed rolls, in which the moulds or embossing hollows are provided on a swivelling mould plate.

Figure 7 shows the mould plate in its lifted position.

Figures 8 and 9 show in section and in plan a mould plate on a large scale.

Figures 10 and 11 show the opening of the die plate in section and elevation on a large scale.

Figures 12 and 13 show further constructional examples in which the inversion of the mould is eliminated.

According to the form of machine shown in Figure 1, a feeding or depositing apparatus of known construction is provided having a hopper 1 adapted to oscillate about the axis of one of the feed rolls 1a, and which carries the other feed roll 1b, the rolls being driven continuously or intermittently in any convenient manner. The hopper terminates in an extrusion chamber 1c to which an extrusion plate 2 is fastened, said plate being provided with nozzles or openings 3.

A table 4 adapted to receive the moulded articles is located below the depositing or feeding apparatus and is pivotally mounted at one end on a shaft 5 its other end being arranged to move up and down by means of the rotary cam 6 and coupling rod 7.

The table carries a pair of side brackets 8 supporting a cross shaft 8b upon which a four faced mould or embossing element 9 is adapted to rotate. The mould element is provided with rows of moulds or impressions 10a, 11a on its opposite faces 10 and and 11, the normal position of the element being such that either the face 10 or 11 is opposed to the nozzles or opening 3.

A crank 17 mounted upon the crank shaft 17a, which is rotated in any convenient manner, is connected by a rod 18 to an arm 19 fixed to a gear wheel 20. The gear wheel meshes with a gear 21 free to revolve in the shaft 11a and having an arm 22 attached thereto. The arm carries a pawl 22a which engages a ratchet wheel 23 which is fixed to the mould element 9. As the crank 17 rotates, the gears 20, 21 will be oscillated and thus the ratchet and pawl will intermittently turn the mould element through half a revolution.

Adjacent the mould element 9, a pair of side brackets 25 is provided which supports a shaft 24a on which a roll 24 is mounted. This roll forms a driving member for an endless conveyor band 26 which passes over a delivery blade 8a extending transversely between the brackets 8 and carried thereby. The conveyor band 26 is adapted to be driven intermittently by a gear 27 rigid with the shaft 24a and meshing with a gear 27a fixed to the ratchet wheel 23. By this arrangement the upper run of the conveyor or band 26 will have movement imparted to it as the mould element 9 receives an intermittent rotary movement.

A wire cut device is associated with the nozzle 3 and comprises a pair of arms 13 carrying a transverse wire, such arms being mounted upon the lever 12 pivoted at 12a. Movement is imparted to the lever 12 through the link 15 which engages in a rotary cam 14. The link 15 is provided with a supporting link 16 pivoted at 16a.

In operation, the table 4 is raised by the cam 6 and presses the mould element 9 against the nozzles 3, whereby the material extruded from the extrusion chamber is moulded or embossed. The table is then moved downwardly to release the moulds from the embossed or moulded pieces and the cutting wire is traversed across the face of the nozzles to sever the embossed ends of the extruded material, which fall onto the surface 10 or into the mould impressions therein.

The mould element is then rotated 180° to bring the lower face 11 of the mould element into position ready for moulding or embossing. During this rotation the moulded or embossed piece lying on the surface 10 will be delivered to the conveyor band 26 and finally delivered over the blade 8a onto the conveyor 28 or tray carried thereby. It will be appreciated that the moulded or embossed pieces will be inverted as they are delivered from the mould to the conveyor band 26 so that they will be finally delivered to the conveyor 28 the right way up, the moulded or embossed side of the article being on top.

In order to prevent the moulded article being pressed between the mould surface and the conveyor 26, the mould element is provided with side plates 29, the edges of which project beyond the surfaces 10 and 11 and form distance pieces, whereby a space is provided between the mould face and the conveyor band during transfer of the moulded pieces thereto.

By this provision of a space, the moulded pieces may slide downwardly into contact with one of the plates 29 so that a row of pieces will be aligned and thus even setting of rows on the conveyor 28 or pans thereon will be effected.

In the modification shown in Figure 3, a non-oscillating type of hopper 30 is provided having feed rolls 30a, 30b, beneath which an extrusion chamber 30c is provided to which a die plate 2 is bolted having extrusion nozzles or openings 3. In this form, the mould element 9a is octagonal in cross-section and provided with eight mould faces 9b so that it is only moved 45° at each intermittent movement. In consequence there will be longitudinally extending distance strips 29a between the adjacent mould faces instead of side plates as in Figure 1. Further the cam 6a is shaped to provide a longer filling period while shortening the time for raising and lowering the table 4. Otherwise the parts are similarly arranged to corresponding parts in Figure 1.

The arrangement of the delivery band 26 in association with the mould element 9 is clearly shown in Figure 4 which also indicates the aligning of the moulded or embossed shapes by the distance strips 29a so that they are evenly delivered onto the conveyor 28, pans, plates or the like.

According to the form illustrated in Figure 5, the moulding or embossing member 32 is of cylindrical shape and is provided with six rows of moulds 33. The face of the extrusion plate or die is curved at 3a complementary to the cylindrical surface of the mould element, so as to provide a tight joint when the mould element is raised into contact with such face during the moulding or embossing period.

In consequence of this curving of the die face the cutting wire is adapted to partake of a curved path in severing the extruded moulded or embossed piece. For this purpose the arms 13 which carry the transverse cutting wire are pivoted upon the arm and have an extension beyond the pivot. A spring 36 is connected to such extension and a hook on the arm 12 and tends to move the cutting wire upwardly so that it will follow the curved surfaces 3a of the die aperture. The mould element is provided with circumferential ridges or ribs 37 adapted to contact with the receiving conveyor 26 so as to provide a clearance to avoid injury to the moulded or embossed pieces.

It will be appreciated that the mould 32 is mounted upon a table whereby it may be raised as in the previous modification.

Referring to Figures 6 and 7, the feeding or extrusion apparatus 38 is provided with three feed rolls 38a, 38b, 38c and terminates in an extrusion chamber 38d to which an extrusion or die plate 2 is bolted having die openings 3. As in the previous forms of the apparatus a table 4 pivotally mounted at 5 is arranged beneath the extrusion apparatus and is connected to the rotary cam by the link 7, whereby it may be raised and lowered to bring the mould member into co-operative relation with the die plate 2.

In this form, the moulding or embossing element comprises a mould plate 39 carried in side plates 40 mounted upon the table 4, the plate being adapted to slide in the track 41 of the plate 40. The mould plate is reciprocated between each moulding or embossing operation by crank disc 44, connecting rod 43 and link 42, the latter being coupled to the mould plate. The rod 43 and link 42 are connected to a radius rod 43a pivoted on the table 4.

The mould plate 39 has rigidly fixed thereon a spur wheel 45 on an axis concentric to the curvature of the left-hand edge of the plate as seen in the drawings. This spur wheel is adapted, as the mould plate is moved to the left, to engage the teeth of the rack 46 and cause a turning over of the plate, the extent of turning movement being about 180°. This inverting of the plate causes the moulded article lying on the plate to be delivered with the embossed face uppermost on the receiving conveyor 28, pans or the like. In its return movement the reverse action takes place so that the mould face is again in position to be raised for a further moulding or embossing operation. The movement of the mould plate will be clearly understood from Figure 7 which shows the plate being inverted.

It will be understood that the embossed articles are severed by the wire cutting device, after the mould plate has been lowered and detached from the extruded embossed piece.

Figure 8 and 9 illustrate a mould plate 39. The moulds or impressions 33 are enclosed by ridges 47 which during the embossing are adapted to abut against the die plate and ensure a tight joint between the mould and nozzle. The mould plates may be mounted on the mould elements so that they may be interchanged. The impressions may take any desired form and may comprise, for instance, letters.

According to another form, as shown in Figure 12, the mould or embossing element 50 is mounted inside brackets 54 carried by the table 4. The mould element seats upon lugs 55, projecting from the brackets so as to permit slight rocking movement of the element to ensure a tight fit against the nozzle 3 even when the table in its raised position is not exactly horizontal.

The moulded or embossed pieces are adapted to be received by an endless delivery conveyor 56 which passes around a driving roll 57, supported by brackets 57a, and a guide roll 58 supported by brackets 58a and arranged adjacent the mould element. The conveyor is adapted to be driven intermittently by a ratchet and pawl gear 59 connected by a link 60 to a fixed point so that as the table rises a drive is imparted to the conveyor.

The embossed articles, after the mould element is retracted, are cut off by the severing device 64 which is provided with a depending brush device 65 adapted to engage the cut off piece and impart a lateral movement thereto to cause it to fall onto the conveyor. The articles are carried around by the conveyor and deposited right way up on the receiving conveyor 28, pans or the like. For the purpose of ensuring that the articles will be properly turned over the surface of the conveyor 56 may be provided with small pins.

According to a further modification, as shown in Figure 13, the moulded or embossed pieces are delivered from the conveyor 56 to an inverting conveyor 61 similar to conveyor 26 employed in the construction shown in Figure 1.

The conveyor 61 is mounted upon a driving roll 62 and a delivery blade 63. The roll 62 is carried in side brackets 62a while the blade 63 extends transversely and is supported by the brackets 57a. The disposition of the conveyor 61 is such that a suitable distance is provided between such conveyor and the conveyor 56 where it passes around the drum 57 to avoid pressure upon the embossed pieces. The conveyor 61 is driven from the drum 57 by a crossed belt 66 and pulley 67, 68 on the roll 62 and drum 57.

A container 70 with a rotary brush 71 is provided beneath the conveyor 56 being carried by the table 4. This brush applies yolk of egg or other solution to the band 56 which is transferred to the embossed faces of the moulded pieces, whereby the articles adhere to the conveyor and are securely carried round to be deposited.

The openings 3 in the die or extrusion plate 2 may be provided with thin dividing members 70 in known manner to prevent distortion of the moulded or embossed shapes during severance.

Having now described my invention what I claim as new and desire to secure by Letters Patent is:—

1. A machine for forming moulded or embossed articles of plastic material, such as dough, marzipan or the like, comprising means for extruding the material through a die opening, a rotary moulding or embossing element having a plurality of moulding faces and located below the die opening, means for raising and lowering the element and rotating it to bring a moulding face into register with the die opening, and means for severing an extruded moulded portion.

2. A machine for forming moulded or embossed articles of plastic material, such as dough, marzipan or the like, comprising an extrusion apparatus having means for forcing the material through the opening in a die plate, a moulding or embossing element located below the die plate, continuously operative mechanism for moving said element into register with the die opening to mould the material extruded therethrough and for moving the element away from the die plate to release the element from the extruded moulded end of the material, means operative by said mechanism and in timed relation thereto for severing the said extruded end and a conveyor operative with said moulding element to reverse the moulded portion and deliver it moulded side up.

3. A machine for forming moulded or embossed articles of plastic material, such as dough, marzipan or the like, comprising an extrusion apparatus having means for forcing the material through the opening in a die plate, a rotary moulding or embossing element having a plurality of moulding faces located below the die plate, means for rotating said element into register with the die opening to mould the material extruded therethrough, means for moving the element away from the die plate to release the element from the extruded moulded end of the material, means for severing said extruded end, a conveyor, and means for inverting and delivering the severed portion onto the conveyor whereby it lies on said conveyor with the moulded face uppermost.

4. A machine for forming moulded or embossed articles of plastic material, such as dough, marzipan or the like, comprising an extrusion apparatus having means for forcing the material through the opening of a die plate, an oscillatable table, a moulding or embossing element located on the table below the die plate, means for moving said element into register with the die opening to mould the material extruded therethrough and for moving the table and element away from the die plate to release the element from the extruded moulded end of the material, means operative in timed relation to the oscillatable table for severing said extruded end after said element is moved away from said opening whereby it falls onto the moulding element and means for inverting the mould element to deliver the severed portion.

5. A machine for forming moulded or embossed articles of plastic material, such as dough, marzipan or the like, comprising an extrusion apparatus having means for forcing the material through the opening of a die plate, a moulding or embossing element located below the die plate, means for moving said element into register with the die opening to mould the material extruded therethrough and for moving the element away from the die plate to release the element from the extruded moulded end of the material, means for severing said extruded end whereby it falls onto the moulding element, means for rotating the mould element, a delivery conveyor located adjacent the mould element and having a part extending beneath said element, and means for driving the conveyor in unison with the rotary movements of the mould element, whereby the severed portion is transferred to said conveyor.

6. A machine for forming moulded or embossed articles of plastic material, such as dough, marzipan or the like, comprising an extrusion apparatus having means for forcing the material through the opening of a die plate, a moulding or embossing element located below the die plate, means for moving said element into register with the die opening to mould the material extruded therethrough and for moving the element away from the die plate to release the element from the extruded moulded end of the material, means for severing said extruded end whereby it falls onto the moulding element, a guideway for the mould element, means for traversing the element along said guideway, a pinion on said element and a rack located on said guideway whereby the mould element is inverted when the pin is brought into mesh with the rack during its travel along said guideway.

7. A machine for forming moulded or embossed articles of plastic material, such as dough, marzipan or the like, comprising an extrusion apparatus having means for forcing the material through an opening in a die plate, a moulding or embossing element mounted for rotation below said die plate, means for raising and lowering the mould element into register with the die opening, means for severing moulded portions of the material to permit them to fall onto the mould, a delivery band conveyor located adjacent said element and driven therefrom, said conveyor having a part extending below said element, and spacing means on the mould element adapted to engage the conveyor band during transfer of moulded articles from the element to the conveyor.

8. A machine for forming moulded or embossed articles of plastic material, such as dough, marzipan or the like, comprising means for extruding the material through an opening in a die plate, a moulding or embossing element located below the die plate, means for raising and lowering the element into register with the die opening, a delivery conveyor band located laterally of the moulding element, and means for severing a moulded portion extruded from said die and transferring it laterally into said conveyor band.

9. A machine for forming moulded or embossed articles of plastic material, such as dough, marzipan or the like, comprising means for extruding the material through an opening in a die plate, a moulding or embossing element located below the die plate, means for raising and lowering the element into register with the die opening, a delivery conveyor band located laterally of the moulding element, means for severing a moulded portion extruded from said die and transferring it laterally to said conveyor band, and a delivery conveyor for receiving the moulded portion from said band and delivering it inverted onto a receiving surface.

In testimony whereof I have signed my name to this specification.

ARIBERT KREMMLING.